United States Patent
Kim et al.

(10) Patent No.: US 6,941,327 B2
(45) Date of Patent: Sep. 6, 2005

(54) APPARATUS AND METHOD FOR DATABASE SYNCHRONIZATION IN A DUPLEX SYSTEM

(75) Inventors: Nam-Jin Kim, Seoul (KR); Hyung-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 956 days.

(21) Appl. No.: 09/916,690

(22) Filed: Jul. 30, 2001

(65) Prior Publication Data

US 2002/0059279 A1 May 16, 2002

(30) Foreign Application Priority Data

Jul. 29, 2000 (KR) ........................................ 2000/43983

(51) Int. Cl.⁷ .............................................. G06F 17/30
(52) U.S. Cl. ...................... 707/204; 709/230; 370/230
(58) Field of Search ...................... 707/204; 709/230; 370/276

(56) References Cited

U.S. PATENT DOCUMENTS

| | | | | |
|---|---|---|---|---|
| 5,367,473 A | * | 11/1994 | Chu et al. | 702/186 |
| 5,592,660 A | * | 1/1997 | Yokota et al. | 707/8 |
| 5,623,540 A | * | 4/1997 | Morrison et al. | 379/112.01 |
| 5,737,601 A | * | 4/1998 | Jain et al. | 707/201 |
| 5,907,849 A | * | 5/1999 | Dias et al. | 707/202 |
| 6,226,651 B1 | * | 5/2001 | Masuda et al. | 707/202 |
| 6,298,072 B1 | * | 10/2001 | Koliczew | 370/503 |
| 6,332,198 B1 | * | 12/2001 | Simons et al. | 714/6 |
| 6,421,321 B1 | * | 7/2002 | Sakagawa et al. | 370/238.1 |
| 6,785,728 B1 | * | 8/2004 | Schneider et al. | 709/229 |

* cited by examiner

*Primary Examiner*—Wayne Amsbury
(74) *Attorney, Agent, or Firm*—Fleshner & Kim, LLP (57) ABSTRACT

An improved duplex system is disclosed having a primary system with a primary database and a redundant system with redundant database. The improvement includes a Change List Table (CLT) that records key information regarding each transaction performed on the primary database, which must also be performed on the redundant database to maintain synchronization between the primary and redundant databases. The key information for an $i^{th}$ transaction recorded in the CLT is removed from the CLT when the $i^{th}$ transaction is successfully performed on the redundant database.

24 Claims, 9 Drawing Sheets

APPARATUS AND METHOD FOR DATABASE SYNCHRONIZATION IN A DUPLEX SYSTEM

BACKGROUND OF THE INVENTION

1. Field of the Invention

The present invention relates to a duplex system using a main memory database, and particularly, to a method and apparatus for database synchronization in the duplex system.

2. Background of the Related Art

Systems which are required to process, in real-time, a large amount of data stored on an online network, such as an intelligent network supplying an intelligent information service, a home location register (HLR) in a mobile communication system, and a computer system in a bank, are adopting the duplex storage system to process data smoothly and to prevent an overload. The stored data is constructed as a database structure in order to real-time process the large amount of data promptly and the database is stored in the main memory.

Figure 1:
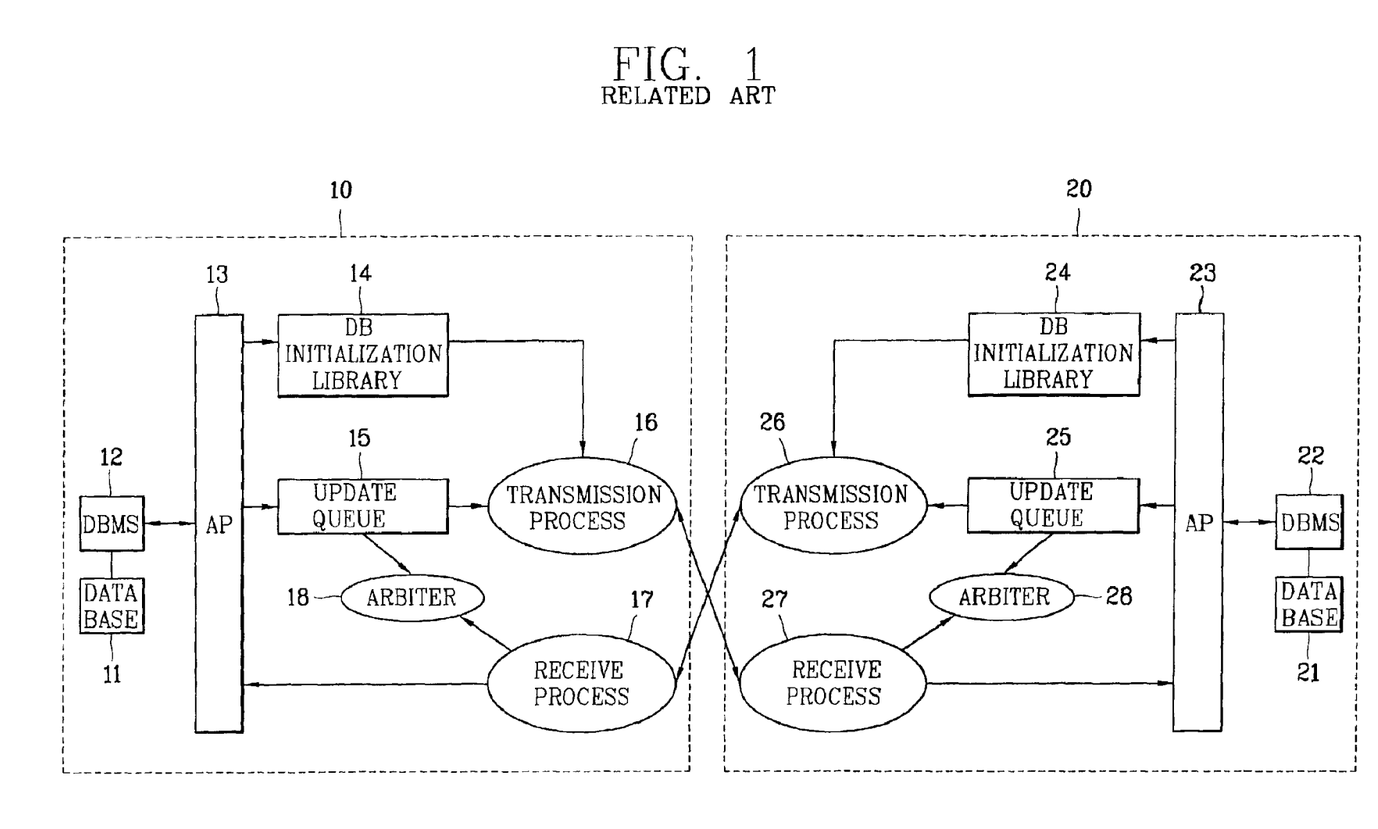
FIG. 1 illustrates a block diagram showing an embodiment of an apparatus for database synchronization in a related art duplex system.

When a duplex database system is used, database synchronization between the duplex database systems should be maintained synchronization both when the systems operate properly and after a fault has occurred in one system, once the faulty system is restored. FIG. 1 is a block diagram showing a structure of an apparatus for database synchronization in a related art duplex system. Two independent database systems, that is, a local system (primary system) 10 and a remote system (secondary system) 20, form the duplex system. Both of the independent systems have the same structure because they are constructed as duplex systems. A description of the local system 10 will now be provided that applies equally well to the remote system. The local system 10 includes a database 11, a Database Management System (DBMS) 12, an Application Process (AP) 13, a Database (DB) initialization library 14, an update queue 15, a transmission process 16, a receive process 17, and an arbiter 18.

The database 11 stores the data processed online by the local system 10, the DBMS 12 manages the database 11, and the application process 13 performs query operations to the database 11. The DB initialization library 14 deletes all data stored in database 21 of the remote system 20 when the remote system 20 is rerun, due to a fault occurring in the remote system 20. The update queue 15 stores updated data when components of the database are updated. Transmission process 16 transmits a database deletion message to the remote system 20, under the control of the DB initialization library 14, and transmits data stored in the update queue 15 to the remote system 20. Receive process 17 receives the messages transmitted from the remote system 20 and transmits then to the application process 13. When data stored in the update queue 15 fails to be reflected in the remote system 20, the arbiter 18 records the data in a file.

The operation of the related art duplex database synchronization system is described in relation to its normal operation and to when a synchronization fault occurs.

(A) Normal Operation

When a transaction query process occurs within the local system 10 requiring database synchronization between the duplex systems, application process 13 accesses the database 11 through DBMS 12 and processes the query. Then, the AP 13 stores the transaction information in the update queue 15 so that the transaction information may be reflected to the database of the remote system 20.

Transmission process 16 checks the update queue 15 periodically and, if there is an update transaction in update queue 15, the transmission process 16 transmits the transaction to receive process 27 of the remote system 20. Receive process 27 of the remote system 20 transmits the transaction information to AP 23, which stores the information to database 21 of the remote system 20. After that, if the AP 23 stores the update transaction successfully, transmission process 26 informs receive process 17, of the local system 10, of its success.

When the transaction update of database 21 is successfully reflected in remote system 20, the transaction information is deleted from the update queue 15 of the local system 10. However, if the transaction update to database 21 fails to be successfully reflected in the remote system, arbiter 18 of the local system 10 generates a log file corresponding to the transaction which failed the synchronization. The log file is processed when the system is restarted.

(B) Synchronization Fault

If a fault occurs in a database system, then the system experiencing the fault is restored by copying the entire contents of the operational system to the faulty system. For example, if a fault is generated in the local system 10, the local system 10 is reinitialized using the operational database of the remote system 20, after the fault is repaired. To accomplished this, the reinitialized local system 10 informs the remote system of the reinitialization and then the DB initialization library 24 of the remote system 20 orders the deletion of all data stored in database 11 of the local system 10. The local system 10 deletes all data stored in database 11, in accordance with the database initialization order. Remote system 20 copies the data stored in its database 21 to database 11 of the local system 10, once it learns that database 11 of the local system 10 is reinitialized.

During the copying process, messages that are processed by the remote system concurrently with the copying process are stored in update queue 25. After the copying process to the local system 10 is finished, the remote system 20 transmits the data stored in the update queue 25 to the local system 10 and database synchronization between the remote system 20 and the local system 10 is performed for the messages transferred from update queue 25.

Therefore, when a fault occurring in one system is restored, the data stored in its database is entirely deleted. Thereafter, the data stored in the other system is copied to the restored system. Additionally, database transactions occurring in the operational database during the database copying operation are later reflected to the restored database by the update queue.

As described above, the related art apparatus for database synchronization has the problem that the database synchronization process is complex. When a fault is generated is one system of the duplex systems, the faulty system is reinitialized and data stored in the database of the normal system are copied to the database of the reinitialized system, after all the data stored in the faulty database are deleted. Because a large amount of data must be transferred from one database to the other when a fault occurs, a large processing load is placed on the duplex system.

Additionally, when the updated contents of one database are stored in the update queue for reflection to the other system, while the entire content of a database is being copied, the disk approaching time and data transmission time is long. Therefore, the performance of the main memory database may be lowered.

Also, in the event the reflection of the updated data to the other system fails, the failed operation is stored as a log file and the log file is processed when the system is restarted, later. This, too, reduces the operational speed, due to the time required to generate the file input/output and because the file may be damaged.

SUMMARY OF THE INVENTION

An object of the invention is to solve at least the above problems and/or disadvantages and to provide at least the advantages described hereinafter.

It is an object of the present invention to provide a method and an apparatus for database synchronization in duplex systems by which the database synchronization is secured without the lowering of system function, in duplex systems using main memory databases of the same structure.

It is an another object of the present invention to provide a method and an apparatus for database synchronization in duplex systems by which real-time database synchronization is maintained in duplex systems having main memory databases, by using a change list table (CLT) recording a transaction list on the main memory.

To achieve these and other advantages, there is provided an apparatus for database synchronization in duplex systems comprising a database having a CLT for transaction synchronization; a DBMS for managing the database; an AP for recording information about a transaction on the CLT when a transaction needing synchronization is performed, wherein database synchronization is maintained by performing transaction synchronization between the duplex systems using the CLT; a Process Management Block (PRMB) for managing the AP and managing the communications with the other system of the duplex systems; a message transmission process for transmitting the message transmitted from the AP to the other system; and a message receive process for receiving the message transmitted from the other system and transmitting the message to the AP.

To achieve the objects of the present invention, there is provided a method for database synchronization in the duplex systems comprising a process of identifying whether the duplex systems, having the main memory databases, are operating normally; a process of checking whether the previous transaction in the CLT list corresponds to the current transaction; and a process of maintaining database synchronization by reflecting a result of a transaction to the database of the other system, in accordance with the kind of transaction operation performed and the kind of the previous transaction operation existing in the CLT.

To achieve the objects of the present invention, there is provided a method for database synchronization in duplex systems comprising a process of searching the CLT of the normal system database, upon restarting the system in which a fault is generated, and reflecting the updated contents after the fault is generated to the database of the restarted system; and a process of deleting the information about the updated contents searched in the CLT if the reflection of the updated contents succeeds, and maintaining the information about the updated contents searched in the CLT if the reflection of the contents fails.

The objects of the present invention can be achieved in whole or in part by an improved duplex system having a primary system with a primary database and a redundant system with redundant database, wherein the improvement comprises a Change List Table (CLT) that records key information regarding each transaction performed on the primary database, which must also be performed on the redundant database to maintain synchronization between the primary and redundant databases. The key information for an $i^{th}$ transaction recorded in the CLT is removed from the CLT when the $i^{th}$ transaction is successfully performed on the redundant database.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a preferred embodiment of the invention, the duplex systems having main memory databases of the same structure communicate with each other through a Transmission Control Protocol/Internet Protocol (TCP/IP) socket. In addition, the duplex systems are managed by a Change List Table (CLT) so that if a transaction is changed in one system, of the duplex systems, the update transaction can be reflected to the database of the other system. Also, the present invention is based on an Active-Active (load sharing) operational method of duplex systems but is able to support an Active-Standby operational method as well.

Figure 2:
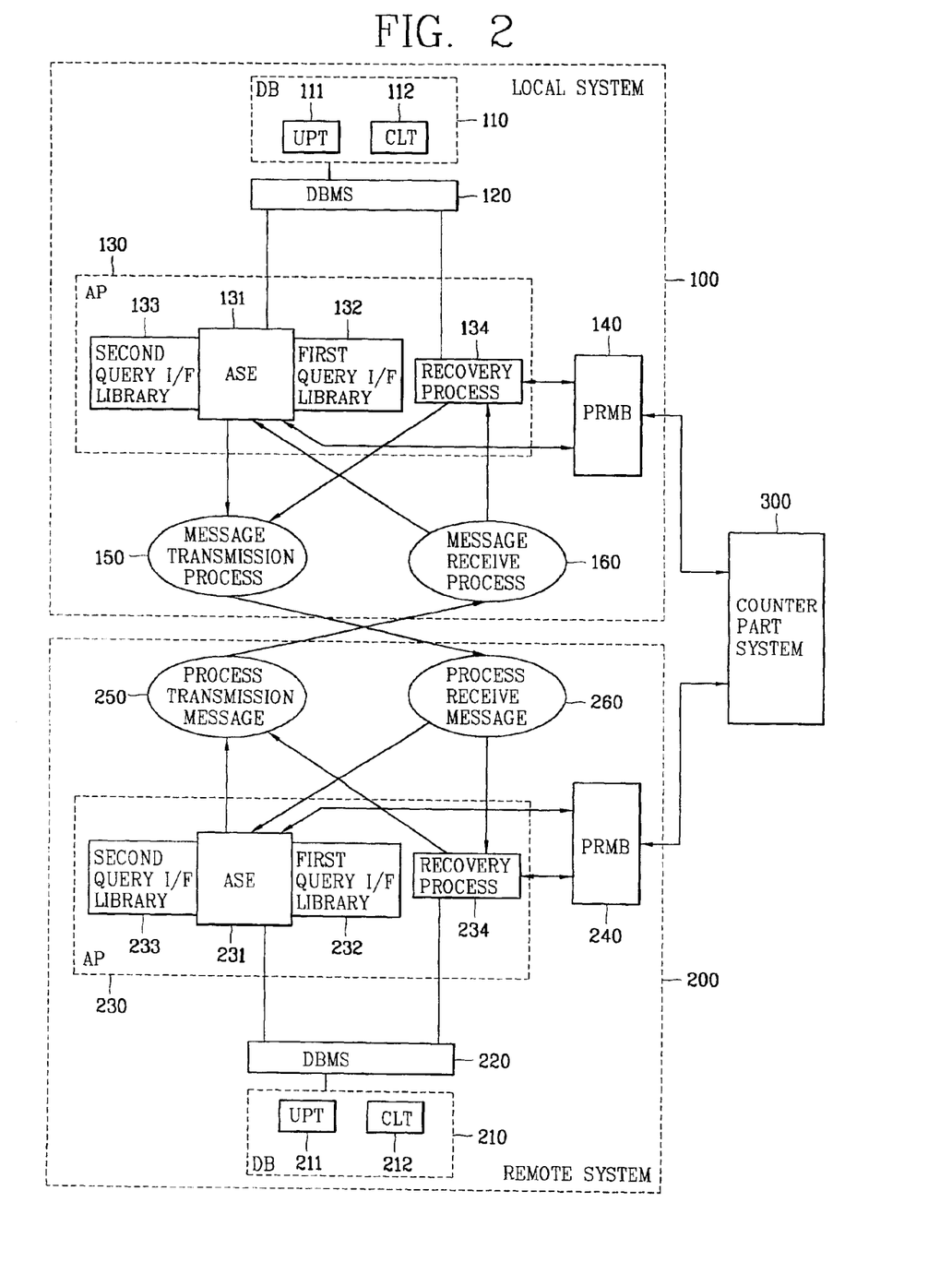
FIG. 2 illustrates a block diagram showing a structure of an apparatus for database synchronization in a duplex system according to a preferred embodiment of the present invention.

FIG. 2 is a block diagram showing the structure of the apparatus for database synchronization in the duplex systems according to a preferred embodiment the present invention. As shown, the duplex systems have the same structure and, therefore, only the structure of the local system (primary system) 100 will be described. The local system includes a database 110, a Database Management System (DBMS) 120, an Application Process (AP) 130, a Process Management Block (PRMB) 140, a message transmission process 150, and a message receive process 160.

Database 110 stores a data table, which is real-time processed by the local system 100, on an online network. The database 110 includes a User Profile Table (UPT) 111, for storing the user profile, and a CLT 112 for recording the update contents of the UPT 111. The CLT 112 is used to synchronize the databases after a transaction is processed. The DBMS 120 manages the database 110.

AP 130 receives a message to be processed, performs the process transaction by approaching the database 110, and performs database synchronization using the CLT 112 when a transaction requiring synchronization is processed. AP 130 includes an Application Service Element (ASE) 131, a first query interface library 132 interfacing the ASE 131 to the database 110, a second query interface library 133 interfacing the ASE 131 to approach to the message transmission process 150, and a recovery process 134, driven when a fault is generated in a remote system 200.

The PRMB 140 manages the AP 130 and is in charge of communication between the duplex systems. The message transmission process 150 transmits a message, received from the AP 130, to the remote system 200 by the TCP/IP method. In addition, the message receive process 160 receives the message transferred from the remote system 200 using the TCP/IP method.

Also, as shown in FIG. 2, a counterpart system 300 communicates with both systems 100, 200 requires the duplex systems 100 and 200 to process its messages as described herein. The operation of the apparatus for synchronizing the database in the duplex systems will now be described for the case of normal operation and the case where a fault has occurred in one system.

(A) Normal Operation.

Both duplex systems 100, 200 receive and process messages simultaneously when the systems are operated according to the Active-Active method. When operated in the Active-Standby method, only one of the duplex systems 100, 200 receives and processes the messages and then subsequently reflects the transaction and then the result to the other system.

With the Active-Standby method, if an operation is performed that may change the status of the database, such as an insert, delete, or update operation, the active local system processes the transaction and transmits a transaction message to the remote system. The transaction message instructs the standby system to execute the transaction in its database.

Figure 3:
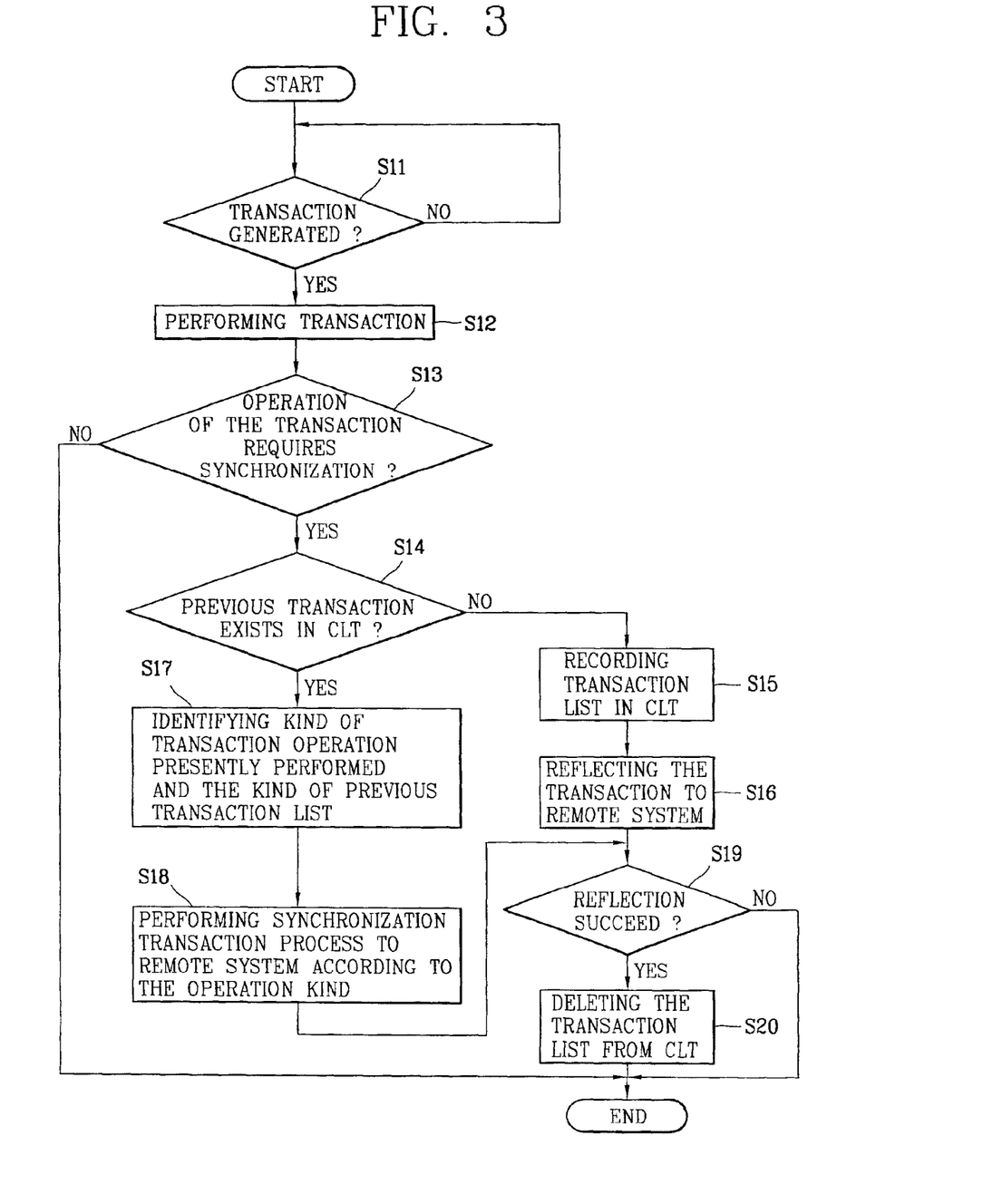
FIG. 3 illustrates a flow chart showing a method for database synchronization between the duplex system, while the system is operating normally, according to a preferred embodiment of the present invention.

FIG. 3 is a flow chart showing the method for synchronizing the databases of the duplex systems during their normal operation, according to a preferred embodiment of the present invention. When a message is transferred from the counterpart system 300, the PRMB 140 of the local system 100 transmits the message to the AP 130. The AP 130 identifies the query request and performs the required transaction by accessing database 110 (S11 and S12). That is, the ASE 131 of AP 130 accesses the database through the first query interface library 132 and performs the required transaction in the data table of the database 110. If the required transaction is performed successfully, the ASE 131 identifies whether the transaction needs to be synchronized with the remote system 200. If the contents of database 110 (S13) are changed by the recent transaction, then synchronization is required. If the operation of the performed transaction does not need synchronization, the operation is ended. When synchronization is required, the ASE 131 accesses the CLT 112 of database 110 through the first query interface library 132 and determines whether there is a previous transaction corresponding to the current transaction in the CLT list 112 (S14). If there is not a previous transaction listed in the CLT 112, the ASE 131 accesses the CLT 112 through the first query interface library 132 and records the current transaction to the list. For example, the operation code of the current transaction, index, and key value of the table in which the transaction is generated may be listed in the CLT 112 (S15). If current transaction is recorded in the CLT 112 normally, the ASE 131 transmits a transaction request message to the message transmission process 150, through the second query interface library 133, to reflect the transaction to the remote system 200. Message transmission process 150 transmits the transaction request message to the remote system 200 using a TCP/TP method (S16).

The message receive process 260 of the remote system 200 transmits the transaction request message to the ASE 231 of AP 230 and ASE 231 determines whether the transaction should occur. If so, ASE 231 performs the transaction by accessing database 210. If this corresponding transaction is performed successfully, ASE 231 of the remote system 200 informs the local system 100 of its success through message transmission process 250. When the success of the reflected transaction is reported by the remote system 200 (S19), the ASE 131 of the local system 100 accesses the CLT 112 through the first query interface library 132 and deletes the corresponding transaction list from the CLT 112 (S20).

As described above, if a transaction that needs synchronization happens in one system, the performed transaction is recorded in the CLT of the system. The transaction is deleted from the CLT after the transaction is successfully reflected to the other system and database synchronization is achieved.

However, if a previous transaction list related to the current transaction exists in CLT 112, the ASE 131 identifies the operation type of the current transaction and that of the previous transaction stored in the CLT list (S17). The local system 100 performs a particular synchronization transaction process with the remote system 200 based on the current transaction type and the previous transaction type listed in the CLT. The method for performing the synchronization process will now be described with reference to FIGS. 4, 5, and 6.

Figure 4:
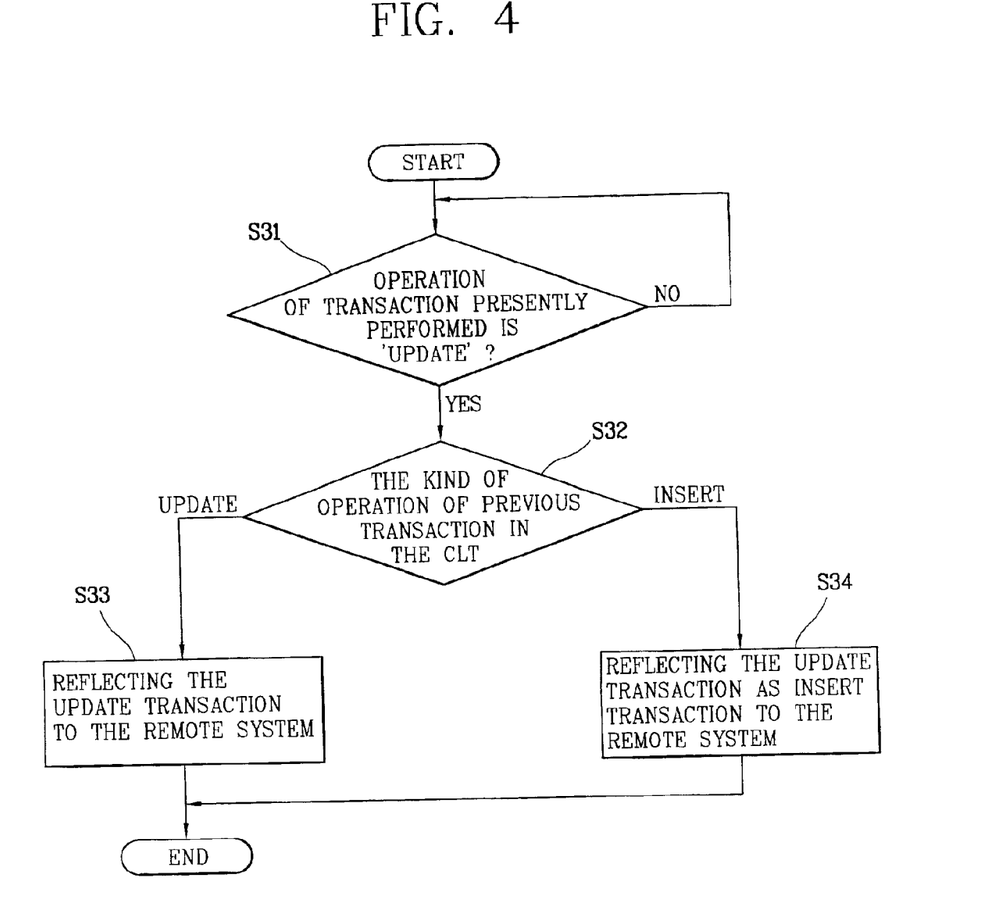
FIG. 4 illustrates a flow chart showing a preferred embodiment method for synchronizing a transaction process performed based on the operation of a previous transaction recorded in the CLT, when the current operation is an 'update' transaction.
Figure 5:
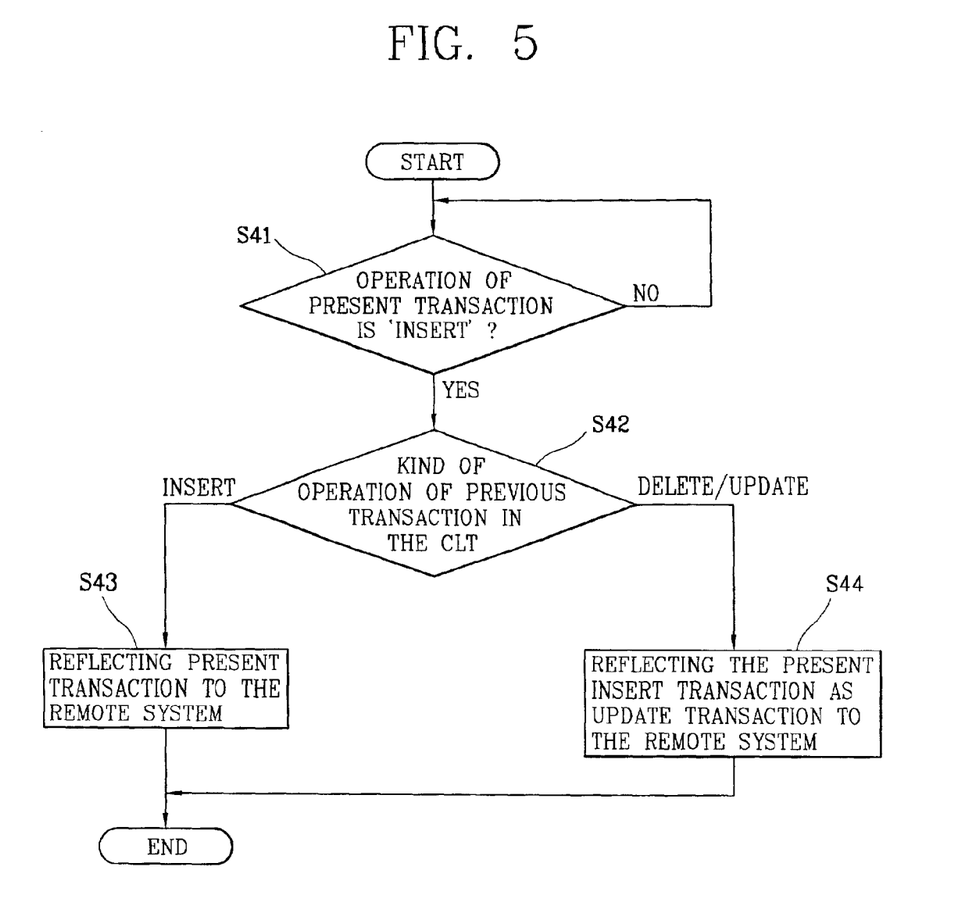
FIG. 5 illustrates a flow chart showing a preferred embodiment method for synchronizing a transaction process performed based on the operation of the previous transaction recorded in the CLT, when the current operation is an 'insertion' transaction.
Figure 6:
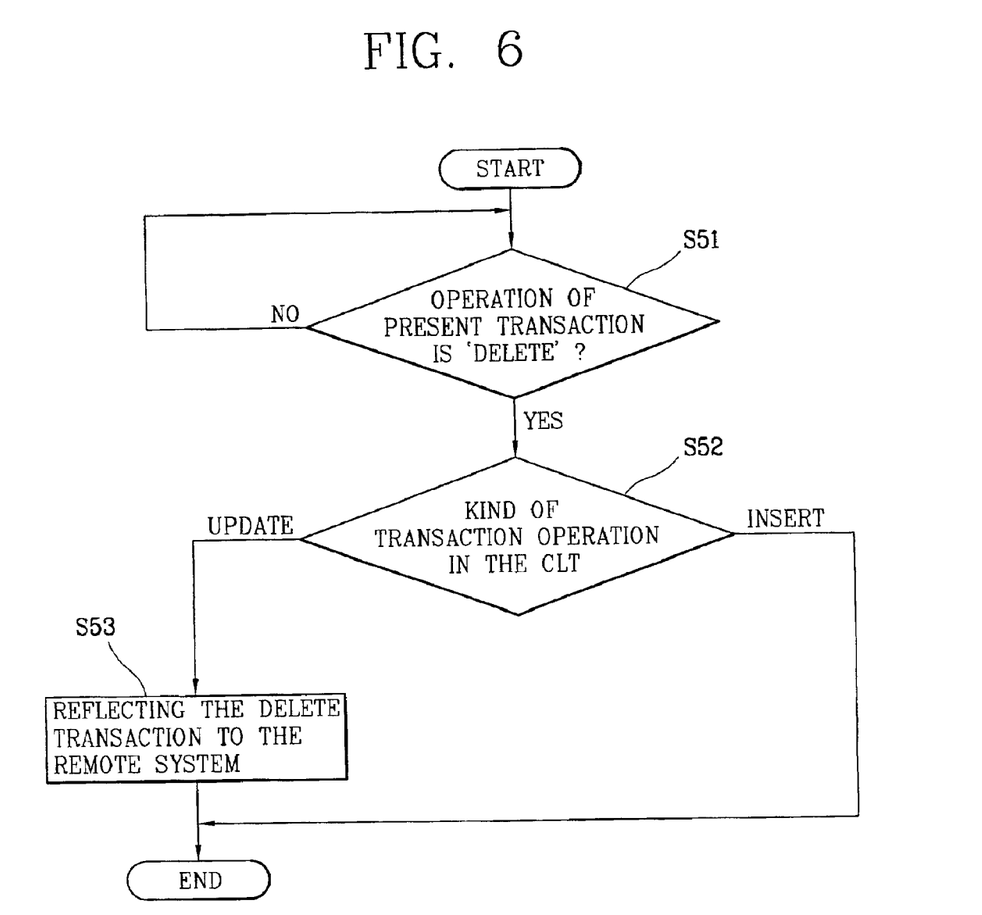
FIG. 6 illustrates a flow chart showing a preferred embodiment method for synchronizing a transaction process performed based on the operation of the previous transaction recorded in the CLT, when the current operation is a 'deletion' transaction.

FIG. 4 is a flow chart showing the method for performing the synchronization process, based on the operation of the transaction recorded on the CLT, when the current transaction is an 'update' operation. FIG. 5 is a flow chart showing the method for performing the synchronization process when the current transaction is an 'insert' operation. FIG. 6 is a flow chart showing the method for performing the synchronization process when the current transaction is a 'delete' operation.

As shown in FIG. 4, if the current transaction is an 'update' operation (S31) and the previous transaction in the CLT 112 is an 'update' operation, then the update transaction generated in the local system, previously, was not successfully reflected to the remote system 200. Therefore the local system 100 should now reflect the update transaction to the remote system 200 (S32 and S33). If the operation of the current transaction is an 'update' operation (S31) and the operation of the previous transaction listed in the CLT 112 is an 'insert' operation, then an insert transaction happened previously in the local system 100 but was not successfully reflected to the remote system 200. Therefore, the local system 100 should now reflect the 'insert' transaction to the remote system 200 (S32 and S34). If the operation of the transaction listed in the CLT is a 'delete' operation, an update transaction for the Tuple deleted from the local system 100 is not generated. In other words, no attempt will be made to reflect the 'update' transaction to the remote system 200 for the deleted Tuple.

As shown in FIG. 5, if the current transaction is an 'insert' operation (S41) and the operation of the previous transaction listed in the CLT 112 is a 'delete' or 'update' operation, then the previous transaction generated by the local system 100 was not successfully reflected to the remote system 200. Therefore, the local system 100 should now reflect the current insert transaction to the remote system 200 instead of the update transaction (S42 and S44). However, if the previous transaction listed in the CLT 112 is an 'insert' operation, then the insert transaction previously generated by the local system 100 has not been successfully reflected to the remote system 200. Therefore, the insert transaction previously generated is not reflected to the remote system 200 but is ignored. However, the current transaction is reflected to remote system 200 (S43).

Referring now to FIG. 6, if the operation of the current transaction is a 'delete' operation (S51) and the previous transaction listed in the CLT 112 is an 'update' operation, then the update transaction generated before was not successfully reflected to the remote system 200. Therefore, the local system 100 should now reflect the current delete transaction to the remote system 200 (S52 and S53). If the operation of the transaction listed in the CLT 112 is a 'delete' operation, the previous delete transaction for the Tuple deleted from the local system 100 is not generated for reflection to the remote system 200. Similarly, when the current transaction is an 'insert' operation and the listed transaction in the CLT 112 is a 'delete' operation, neither transaction gets reflected to the remote system 200.

When ASE 131 reflects the result of a transaction to the remote system successfully, the corresponding transaction is deleted from the CLT 112 list (S19 and S20). However, if the result of the transaction is not reflected to the remote system 200 successfully, ASE 131 maintains the corresponding transaction in the CLT 112 list. Also, when a transaction requiring synchronization is processed successfully and recorded in the CLT but the transaction is not processed successfully in the remote system, then the next transaction reflected to the remote system is determined according to the types of the current and the previously listed CLT operations. Thereby, database synchronization between the local system and the remote system is maintained.

(B) Fault Recovery

Database synchronization should be maintained even when a fault is generated in one system of the duplex systems. For example, suppose a fault is generated in the remote system (secondary system) 200. The recovery operation for synchronizing the remote system 200 with the local system 100 will be described.

Figure 7:
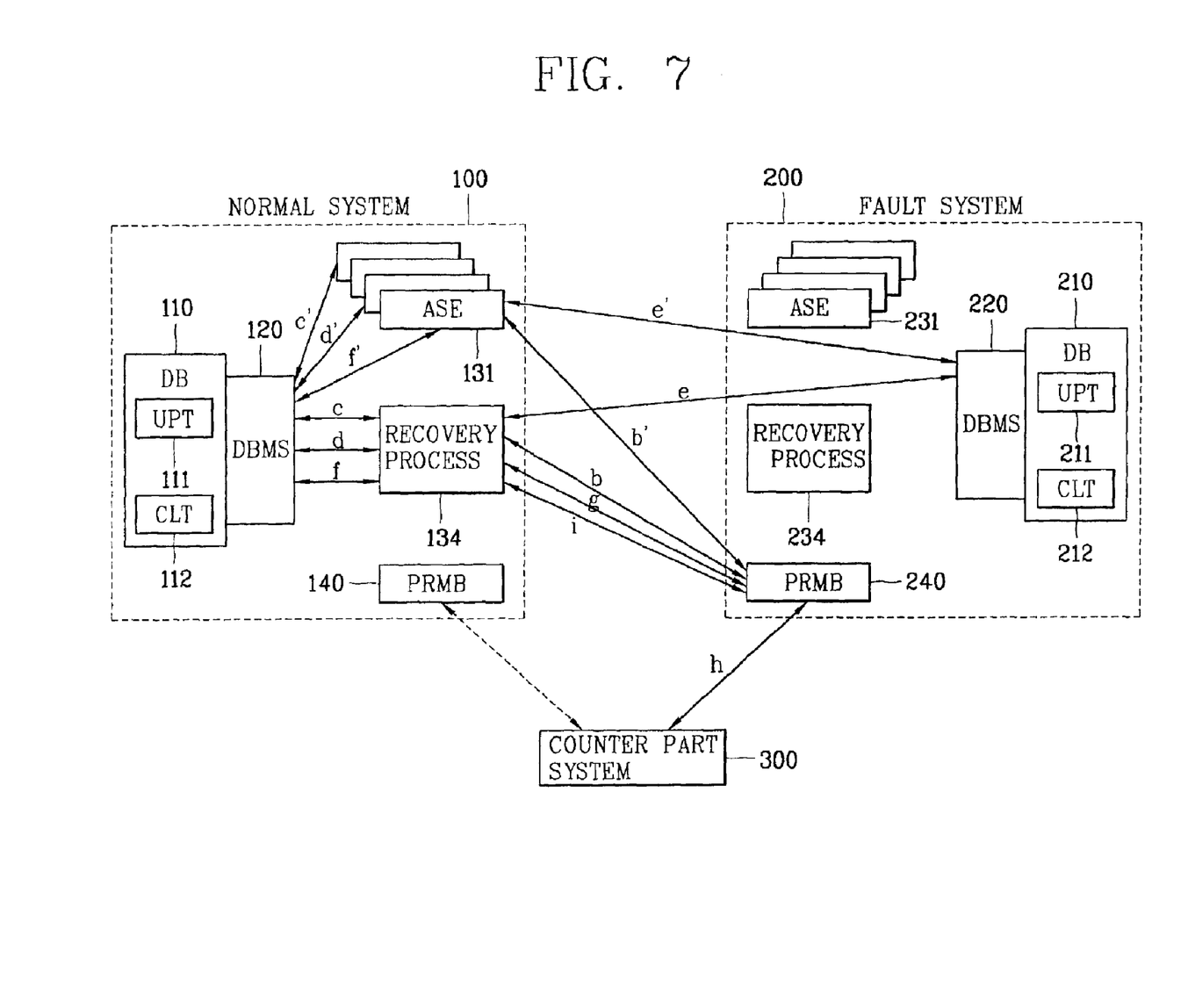
FIG. 7 illustrates a block diagram of a preferred embodiment showing the structure of an apparatus for database synchronization between a system having a fault and a normal system.

FIG. 7 is a block diagram showing a preferred embodiment of an apparatus for achieving database synchronization between the system having the fault and the normal system. Processes b through g and i designate the recovery process of the normal system that are performed, processes b' through f' designate the ASE operation of the normal system, and process h designates the operation of the faulty after it is restarted.

Figure 8A:
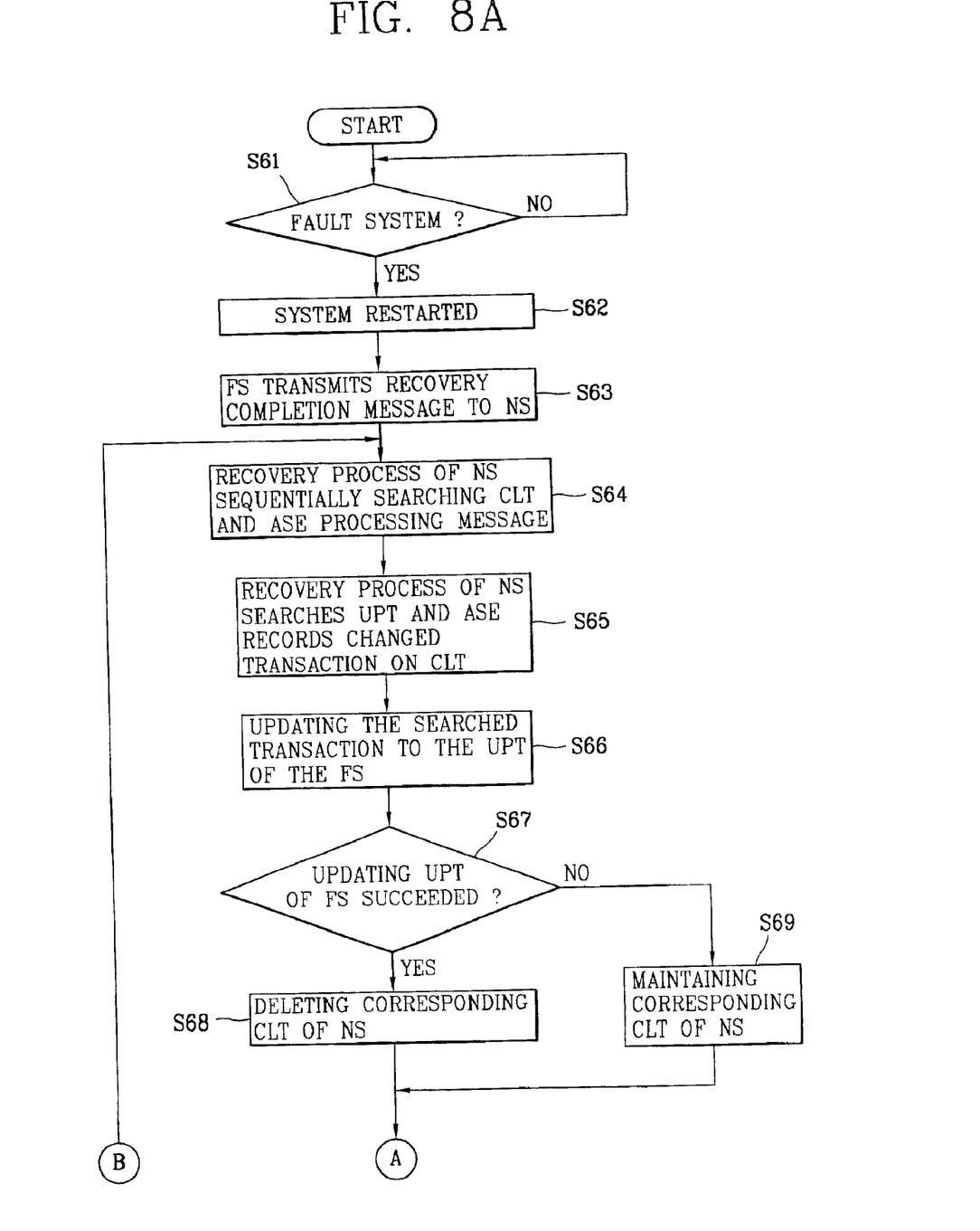
FIGS. 8A and 8B illustrate flow charts showing a preferred embodiment method of restoring the system of FIG. 7 having the fault so that the database synchronization with the normal system can be achieved.
Figure 8B:
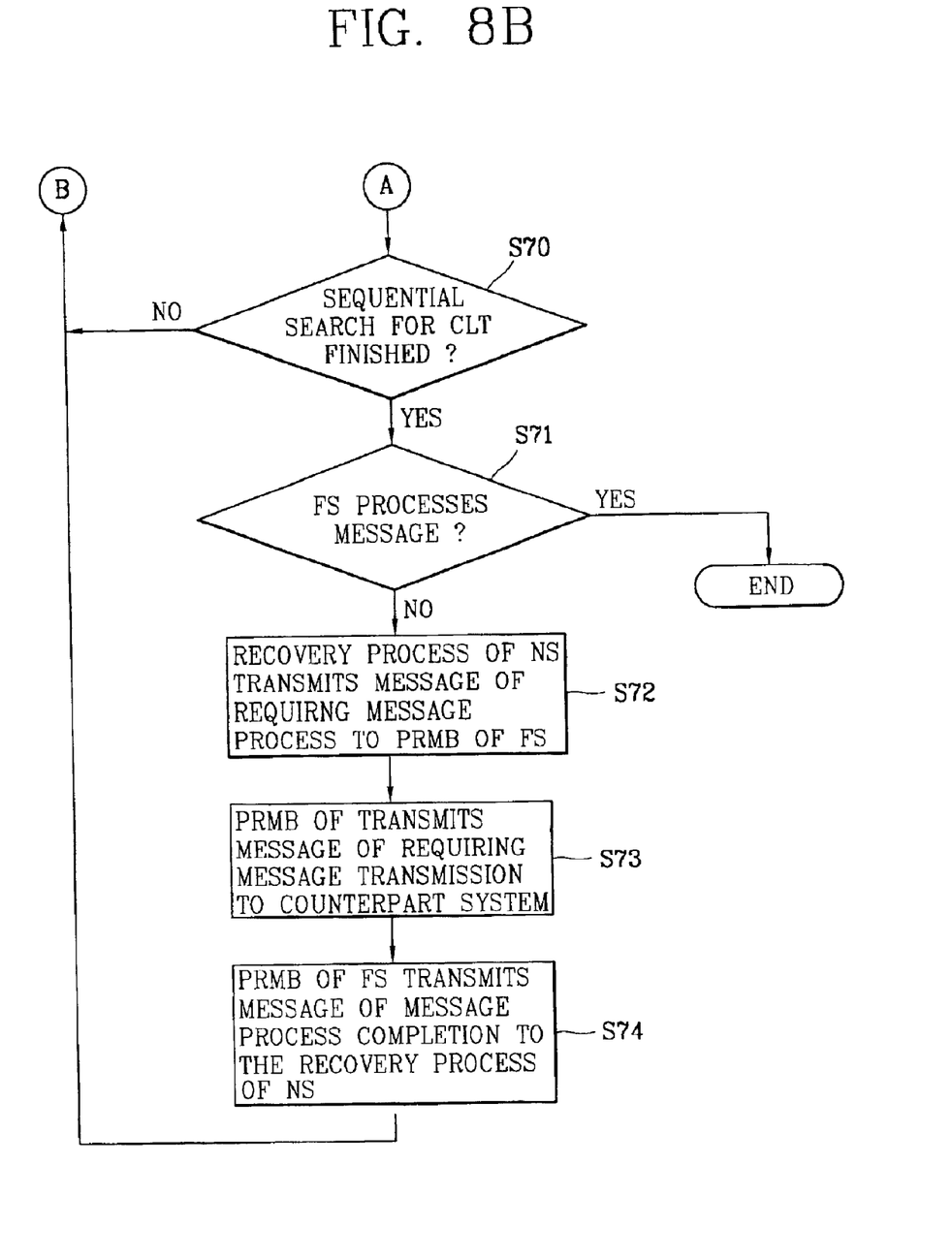

FIGS. 8A and 8B are flow charts showing a preferred embodiment method for recovering the system, in which a fault is generated, so that database synchronization with the normal system can be achieved. For the sake of convenience, the system 200 having the fault is referred to as the Fault System (FS) and the normally operated system 100 is referred to as the Normal System (NS). FS 200 is restarted for its recovery by the operator (S61 and S62). The PRMB 240 of the restarted FS 200 transmits a recovery completion message to the recovery process 134 and to ASE 131 of the NS 100 (S63) (b and b'). The recovery process 134 is driven when a fault is generated in one system between the duplex systems. That is, it is driven when it receives the recovery completion message from the FS 200 and is not operated when the duplex systems are normally operated. ASE 131 is operated when the systems are normally operated and when a fault is generated in one system.

When the recovery process 134 of the NS 100 receives the recovery completion message, it starts a sequential search within the CLT 112 (c). ASE 131 processes messages received from the counterpart system 300, since the fault was generated in the FS 200 (c') (S64). Information about a transaction requiring synchronization that is performed in one system and is not reflected to the other system is recorded in CLT 112. Therefore, if a transaction requiring synchronization is performed after the fault is generated in the remote system 200, the ASE 131 of the local system 100 records the performed transaction to the CLT 112 (d'). Also, if the transaction list is found in the CLT 112, the recovery process 134 sequentially searching the CLT 112 selects the corresponding transaction from the UPT 111 using a key of the found transaction (d) (S65). The recovery system does not select the update contents currently being processed in the UPT 111 by ASE 131.

ASE 131 and the recovery process 134 of the local system 100 reflect the transaction requiring the synchronization, which was identified during the search within the CLT 112 and recovered from the UPT 111, to the remote system 200 (e and e') (S66). If the reflection of the update contents to the UPT 211 of the remote system 200 is successful (S67), the local system deletes the corresponding transaction list in the CLT 112 (f and f') (S68). However, if the reflection to the UPT 211 of the remote system is not successful, the local system 100 maintains the corresponding transaction list in the CLT 112 (S69). Recovery process 134 of the local system 100 identifies whether the sequential search in the CLT 112 is finished or not (S70), and if the search is not finished, the recovery process repeatedly performs processes S64 through S70.

Therefore, database synchronization according to the present invention is not performed in the same way as that of the related art system. The related art system copies the entire database from an operational system to a restored system, after a fault occurs. In a preferred embodiment of the present invention, database synchronization between the duplex systems is achieved and maintained before the fault is generated and, therefore, only the data updated after the fault is reflected to the restarted system.

After the sequential search of the CLT 112 is finished in process S70, the recovery process 134 of the local system 100 identifies whether the remote system is able to process messages (S71). If the remote system is able to process messages, the recovery process is ended. If the remote system is not able to process messages, recovery process 134 transmits a message of inquiring message process, which informs the PRMB 240 that the database synchronization between the remote system 200 and the local system 100 is complete and the remote system 200 may start processing messages (g) (S72). The PRMB 240 of the remote system 200 transmits a message of inquiring message transmission to the counterpart system 300 so that the latter system will forward a message to be processed (h) (S73). Then, PRMB 240 of the remote system 200 transmits a message of starting message process to the recovery process 134 of the local system 100, as a response to the message of inquiring message process (i) (S74).

Therefore, transactions requiring synchronization that were performed in the normal system, after the fault was generated, are reflected to the database of the faulty system after it is restarted. Thereby database synchronization is maintained.

When the duplex systems are operated normally and a transaction requiring synchronization is performed in one system, if a corresponding transaction is in the CLT, the corresponding transaction is reflected to the other system in accordance with the type of current transaction operation and the type of transaction operation listed in the CLT. In this way, database synchronization is maintained in real-time in the duplex system. In addition, transactions requiting synchronization performed in one system and not reflected to the other system are reduced, thereby increasing the accuracy of database synchronization.

When a fault is generated in one system of the duplex systems, the transactions requiring synchronization performed in the normal system, after the fault was generated, are reflected to the restarted system using the CLT of the normal system. There is no need to initialize the database of the restarted system as in the related art. Also, the problem of the related art that the data transmission amount is increased because all the data of the normal system is transmitted to the initialized database can be solved. Moreover, the method according to the preferred embodiment of the present invention maintains database synchronization with reference to the CLT of the database, so access time to the disk and the data transmission time can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for database synchronization in a duplex system, each system of the duplex system comprising:
   a database having a Change List Table (CLT) that provides transaction synchronization;
   a Database Management System (DMS) that manages the database;
   an Application Process (AP) that records information about a transaction in the CLT and maintains the database synchronization by performing a transaction synchronization between the duplex system using the CLT;
   a Process Management Block (PRMB) that manages the AP and manages communications with the other system of the duplex system;
   a message transmission process that transmits an outgoing message communicated from the AP to the other system; and
   a message receive process that receives an incoming message transmitted from the other system and conveys the incoming message to the AP.

2. The apparatus of claim 1, wherein the AP comprises:
   an Application Service Element (ASE) that performs the transaction, records the information about the transaction on the CLT of the database, and performs the transaction synchronization between the duplex system using the CLT;
   a first query interface library that interfaces the ASE with the CLT;
   a second query interface library that interfaces the ASE with the message transmission process; and
   a recovery process that is driven when a fault is generated in one system of the duplex system and performs the database synchronization between the duplex system using the CLT.

3. The apparatus of claim 2, wherein if a transaction that needs synchronization is performed, the ASE records the information about the transaction on the CLT, then deletes the information from the CLT if the transaction is reflected to the database of the other system successfully, and maintains the information in the CLT if the transaction is not successfully reflected to the database of the other system.

4. A method for database synchronization in a duplex database system, wherein each database system of the duplex system has a main memory database, the method comprising:
   identifying whether the main memory database of either database system has encountered a fault;
   checking whether a previous transaction corresponding to a current transaction is listed in a Change List Table (CLT) of a primary database of the main memory databases of the duplex system; and
   maintaining the database synchronization by reflecting a result of the current transaction to the database of the other database system in accordance with a first type of the current transaction and a second type of the previous transaction listed in the CLT.

5. The method of claim 4, further comprising:
   reflecting an update transaction to the database of the other system as the result if the current transaction is the update transaction and the previous transaction listed in the CLT is the update transaction;
   reflecting an insert transaction to the database of the other system as the result if the previous transaction listed in the CLT is the insert transaction and the current transaction is the update transaction; and
   deleting the previous transaction from the CLT if the reflection of the result to the other system is successful and maintaining the previous transaction in the CLT if the reflection of the result.

6. The method of claim 4, further comprising:
   reflecting an insert transaction to the database of the other system as the result if the current transaction is the insert transaction and the previous transaction is the insert transaction;
   reflecting an update transaction to the database of the other system as the result if the current transaction is the insert transaction and the previous transaction listed in the CLT is either a delete transaction or the update transaction; and deleting the previous transaction from the CLT if the reflection of the result to the other system is successful and maintaining the previous transaction in the CLT if the reflection of the result fails.

7. The method of claim 4, further comprising:

reflecting a delete transaction to the database of the other system as the result if the current transaction is the delete transaction and the previous transaction listed in the CLT is an update transaction;

not reflecting the current transaction as the result to the database of the other system if the previous transaction listed in the CLT is an insert transaction and the current transaction is the delete transaction; and deleting the previous transaction from the CLT if the reflection of the result to the other system is successful and maintaining the previous transaction in the CLT if the reflection of the result fails.

8. The method of claim 4, further comprising:

recording information about the current transaction in the CLT if the previous transaction is not listed in the CLT;

reflecting the recorded transaction as the result to the other system;

deleting the information from the CLT if the reflection of the result is successful; and maintaining the information about the transaction in the CLT if the reflection of the result fails.

9. The method of claim 4, further comprising:

reflecting contents of the primary database updated since the fault is generated to a fault system of said duplex system by sequentially searching the CLT of the primary system to identify the updated contents, after the fault system is restarted; and deleting information about the updated contents identified in the CLT if the reflection is successful and maintaining the information in the CLT if the reflection fails.

10. The method of claim 9, further comprising:

transmitting a recovery completion message, after restarting the fault system, from the fault system to the primary system informing the primary system that the fault system can be recovered to a normal status;

receiving the recovery completion message by the primary system;

sequentially searching the CLT of the primary system to check the contents updated after the fault is generated;

performing a real-time transaction for a message received from a counterpart system;

selecting the updated contents identified by the CLT information from a User Profile Table (UPT) of the database in the primary system and recording the information about an update transaction of the updated contents within the CLT; and reflecting the selected update contents from the primary system to the fault system.

11. A method for database synchronization in a duplex system, comprising:

identifying whether a previous transaction list related to a current transaction exists in a Change List Table (CLT) of a first system of the duplex system;

maintaining the database synchronization by reflecting a resulting transaction to a database of the other system according to a type of the current transaction and the type of the previous transaction listed in the CLT;

recording information about the current transaction in the CLT if the previous transaction is not listed in the CLT;

reflecting the current transaction to the database of the other system;

deleting the information about the current transaction from the CLT if the reflection is successful; and maintaining the information in the CLT if the reflection fails.

12. The method of claim 11, further comprising:

reflecting the current transaction to the database of the other system as the resulting transaction if the current transaction is an update transaction and the previous transaction in the CLT is the update transaction, and reflecting an insert transaction to the database of the other system as the resulting transaction if the previous transaction in the CLT is the insert transaction and the current transaction is the update transaction; and deleting the information of the previous transaction from the CLT if the reflection of the resulting transaction to the database of the other system is successful and maintaining the information of the previous transaction in the CLT if the reflection of the resulting transaction fails.

13. The method of claim 11, further comprising:

reflecting an insert transaction to the database of the other system as the resulting transaction if the current transaction is the insert transaction and the previous transaction listed in the CLT is the insert transaction, and reflecting an update transaction to the other system as the resulting transaction if the previous transaction listed in the CLT is either a delete transaction or the update transaction; and deleting the information of the previous transaction from the CLT if the reflection of the resulting transaction to the other system is successful and maintaining the information of the previous transaction in the CLT if the reflection of the resulting transaction fails.

14. The method of claim 11, further comprising:

reflecting an insert transaction to the database of the other system as the resulting transaction if the current transaction is a delete transaction and the information of the previous transaction in the CLT is an update transaction, and not reflecting the delete transaction to the other system as the resulting transaction if the previous transaction in the CLT is the insert transaction; and deleting the information of the previous transaction from the CLT if the reflection of the resulting transaction to the other system is successful and maintaining the information of the previous transaction in the CLT if the reflection of the resulting transaction fails.

15. A method for database synchronization in a duplex system, comprising:

reflecting contents updated, after a fault is generated, to a fault system of the duplex system after the fault system is restarted, by sequentially searching a Change List Table (CLT) of a database in a normal system of the duplex system; and deleting information about the updated contents searched from the CLT if the reflection to the other system is successful, and maintaining the information in the CLT if the reflection fails.

16. The method of claim 15, further comprising:

transmitting a recovery completion message from the fault system to the normal system, if the fault system is restarted, indicating that the fault system can be recovered from the normal system;

receiving the recovery completion message by the normal system;

sequentially searching the CLT of the normal system to check CLT information updated after the fault is generated;

performing a current transaction for a message received from a counterpart system;

selecting the updated contents from a Use Profile Table (UPT) corresponding to the CLT updated information within a database in the normal system, and recording subsequent information about an update transaction in the CLT; and transmitting a message inquiring transaction process from the normal system to the fault system so that the fault system performs the selected update transaction.

17. The method of claim 16, further comprising:

transmitting a requesting message process from a recovery process of the normal system to a Process Management Block (PRMB) of the fault system;

transmitting an inquiring message transmission from the PRMB of the fault system to the counterpart system so that the current transaction message is transmitted by the counterpart system; and transmitting a completing message process as a response to the message for requesting message process from the PRMB of the fault system to the recovery process of the normal system.

18. A duplex system having a primary system with a primary database and a redundant system with redundant database, wherein the improvement comprises:

a table that records key information regarding each transaction performed on the primary database, which must also be performed on the redundant database to maintain synchronization between the primary and redundant databases, wherein the key information for an $i^{th}$ transaction recorded in the table is removed from the table when the $i^{th}$ transaction is successfully performed on the redundant database.

19. The duplex system of claim 18, wherein:

the $i^{th}$ transaction performed on the primary database is communicated to the redundant system in real time, after the key information regarding this transaction is recorded to the table;

the redundant system attempts to perform the $i^{th}$ transaction on the redundant database; and a success message is communicated to the primary system if the redundant system successfully performs the $i^{th}$ transaction on the redundant database and the success message causes the primary system to remove the key information for the $i^{th}$ transaction from the table.

20. The duplex system of claim 19, wherein:

current key information of a current transaction performed on the primary database is compared by the primary system with previous key information recorded in the table regarding a previous transaction;

the current key information is recorded to the table if it does not match the previous key information; and the current key information is not recorded to the table if it matches the previous key information.

21. The duplex system of claim 20, wherein:

the primary system compares the type of the current transaction with the type of the previous transaction, if a first portion of the current key information matches a second portion of the previous key information;

the primary system communicates the current transaction to the redundant system as an update type of transaction if the current transaction and the previous transaction are both update types of transactions; and the primary system communicates the current transaction to the redundant system as an insert type of transaction if the current transaction is an update type of transaction and the previous transaction is an insert type of transaction.

22. The duplex system of claim 21, wherein:

the primary system communicates the current transaction to the redundant system if the current transaction and the previous transaction are both insert types of transactions; and the primary system communicates the current transaction to the redundant system as the update type of transaction if the current transaction is the insert type of transaction and the previous transaction is either a delete type of transaction or the update type of transaction.

23. The duplex system of claim 22, wherein:

the primary system communicates the current transaction to the redundant system if the current transaction is the delete type of transaction and the previous transaction is the update type of transaction; and the primary system does not communicate the current transaction to the redundant system if the current transaction is the delete type of transaction and the previous transaction is the insert type of transaction.

24. The duplex system of claim 18, wherein:

when a fault occurs in the redundant system, the primary system sequentially accesses a $k^{th}$ element of key information relating to the $i^{th}$ transaction, of j transactions having key information stored to the table;

for each $k^{th}$ element of key information accessed, the primary system recovers the related $i^{th}$ transaction information from a User Profile Table (UPT) of the primary database and communicates the related $i^{th}$ transaction information to the redundant system; and the $k^{th}$ element of key information relating to the $i^{th}$ transaction recorded in the table is removed from the table when the $i^{th}$ transaction is successfully performed on the redundant database.

* * * * *